Aug. 23, 1966 D. E. ELSON 3,267,974
SAW DUST BLOWER FOR PORTABLE POWER-DRIVEN SAW
Filed July 16, 1964
3 Sheets-Sheet 1
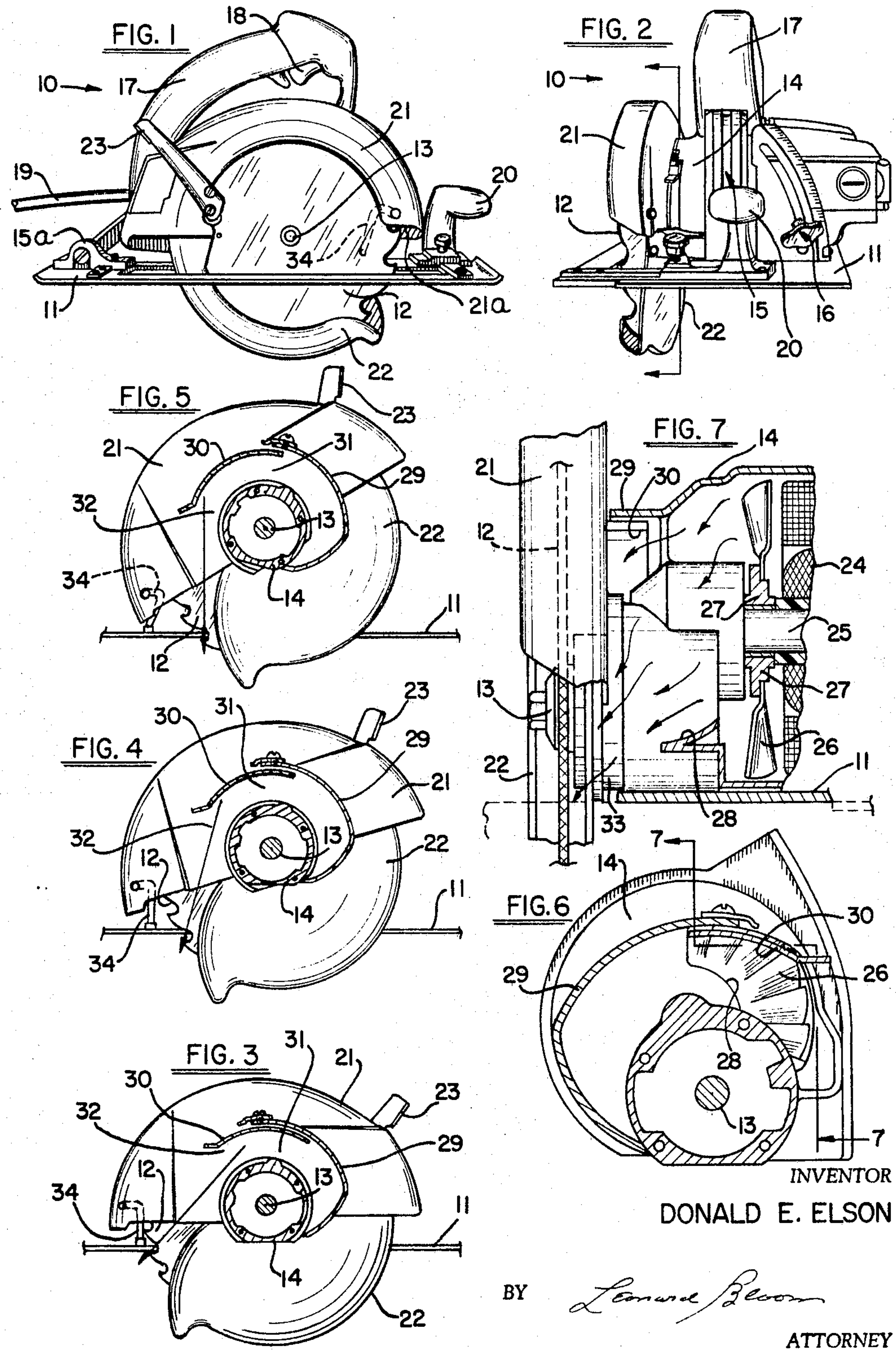
INVENTOR
DONALD E. ELSON
BY Leonard Bloom
ATTORNEY SAW DUST BLOWER FOR PORTABLE POWER-DRIVEN SAW
Filed July 16, 1964
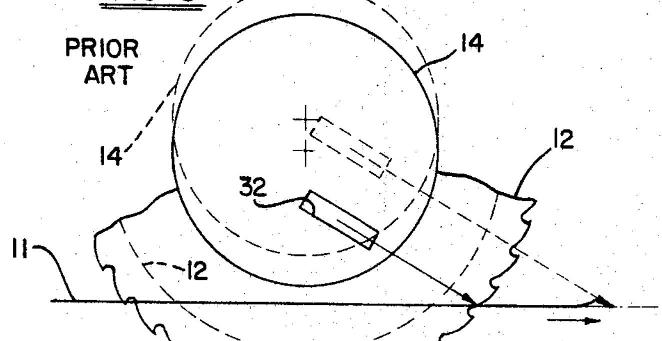
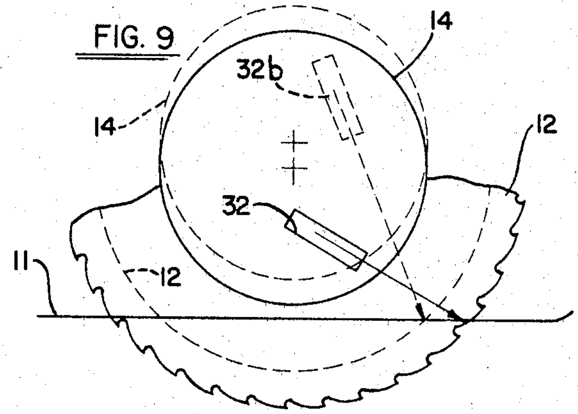
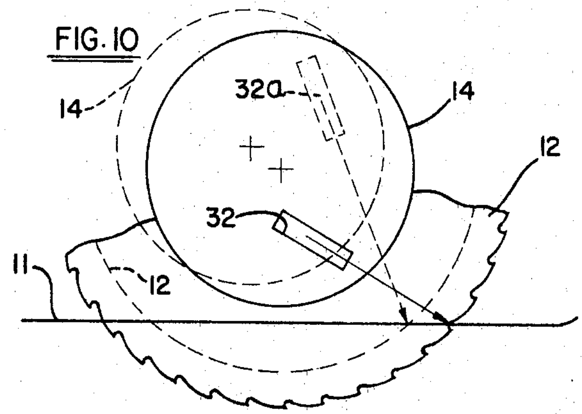
*INVENTOR*
DONALD E. ELSON
BY Leonard Bloom
*ATTORNEY*

SAW DUST BLOWER FOR PORTABLE POWER-DRIVEN SAW
Filed July 16, 1964
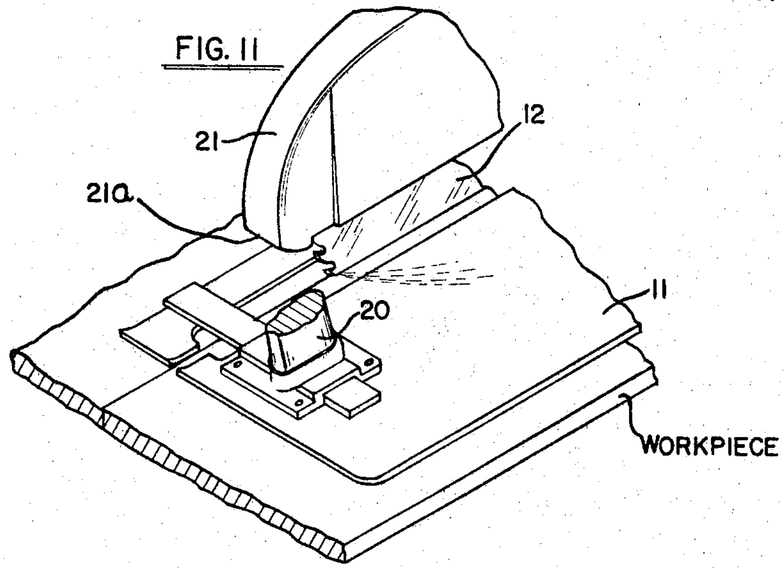
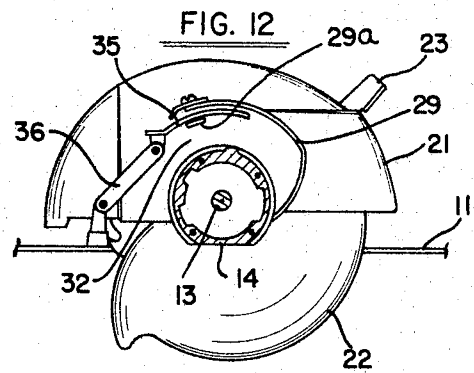
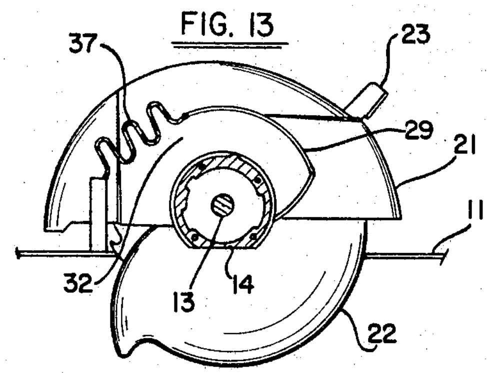
INVENTOR
DONALD E. ELSON
BY Leonard Bloom
ATTORNEY United States Patent Office 3,267,974
Patented August 23, 1966

3,267,974
SAW DUST BLOWER FOR PORTABLE POWER-DRIVEN SAW

Donald E. Elson, Baltimore, Md., assignor to The Black and Decker Manufacturing Company, Towson, Md., a corporation of Maryland Filed July 16, 1964, Ser. No. 383,051
6 Claims. (Cl. 143—43)

The present invention relates to a saw dust blower for a portable power-driven saw, and more particularly to a means to compensate for the selective raising and lowering movements of the blade with respect to the shoe plate to thereby insure that the air stream will be directed at all times to the immediate vicinity of the line-of-cut on the work surface regardless of the particular depth-of-cut position to which the saw has been adjusted.

In the prior art of which I am aware, portable power-driven saws, such as a hand-operable portable electric saw, have been designed and manufactured in which a suitable air discharge means including some type of discharge opening is provided for directing a stream of air to the approximate point where the cutting edge of the blade leaves the work; the purpose of the air stream is to blow the saw dust particles and chips away from the vicinity of the succeeding portion of the line-of-cut on the work surface, so that the operator's vision of the line-of-cut will not be obscured. Invariably, however, the prior art structures have resorted to optimising the location of the air discharge opening for the usual maximum depth-of-cut position of the blade, and no means have been provided to adjust the position of the air discharge opening with respect to the shoe plate for all other depth-of-cut positions. Consequently, whether the housing is raised with respect to the shoe plate to facilitate a reduced depth-of-cut position of the blade, two conditions occur: first, the cutting edge of the blade intersects the plane of the shoe plate at a position which is rearwardly from its previous maximum depth-of-cut position; and secondly, the air discharge opening is raised with respect to the shoe plate, but still parallel to its previous position, such that the air stream is now directed to a forward portion of the shoe plate quite remote from the previous locality at which the air stream was directed. Not only is the intersection of the blade and the shoe plate being retracted rearwardly at a reduced depth-of-cut position, but at the same time, the air stream is being advanced forwardly of the shoe plate, such that in the prior art structures, the saw dust blower means becomes increasingly ineffective as the unit is adjusted for still shallower cuts. Consequently, the prior art designs, when adjusted to a reducted depth-of-cut position, are characterized by an undesirable accumulation of saw dust in the vicinity of the cutting edge of the blade; and this obscures the operator's vision of the succeeding portion of the line-of-cut and hence interfers with his convenient usage and accurate guidance of the tool.

Accordingly, it is an object of the present invention to alleviate the aforementioned deficiencies of the prior art by insuring that the air stream will always be directed to the proximity of the line-of-cut regardless of the particular depth-of-cut position of the saw blade with respect to the shoe plate.

The present invention finds particular utility in conjunction with a portable power-driven saw of the type having a shoe plate by means of which the unit may be supported on the top surface of a workpiece, a blade extending through the shoe plate to engage the work, a housing with a motor to drive the blade, a guard for the blade, means to raise and lower the housing with respect to the shoe plate for selective depth-of-cut positions of the blade, and air discharge means for directing a stream of air to the approximate point where the cutting edge of the blade leaves the work, thereby blowing the saw dust away from the vicinity of the succeeding portion of the line-of-cut on the work surface.

More particularly, the present invention comprises an improved means to automatically change the direction of the air stream with respect to the shoe plate in accordance with the selective raising and lowering movements of the housing, whereby the air stream generated by the air discharge means is always directed to the proximity of the respective line-of-cut regardless of the particular depth-of-cut position of the blade.

In accordance with another aspect of the invention, the improvement comprises a movable member which cooperates with the housing to form an air discharge opening therebetween. An air blower means is provided in the housing; and means are provided to communicate the air blower means with the air discharge opening, whereby a stream of air is directed to the line-of-cut to blow away the saw dust particles. Means are further provided to automatically change the position of the movable member with respect to the shoe plate in accordance with the selective raising and lowering movements of the housing with respect to the shoe plate, thereby automatically changing the position of the air discharge opening, such that the air stream is always directed to the proximity of the respective line-of-cut regardless of the particular depth-of-cut position of the blade.

In accordance with a preferred embodiment of the present invention, a blade guard is mounted for pivotal movement on the housing in accordance with the selective raising and lowering movements of the housing with respect to the shoe plate; and the movable member comprises an arcuately-formed flame carried by the pivotably-mounted guard and telescopically received within the housing.

In accordance with a first modification of the present invention, the means to automatically change the position of the movable member comprises a pivoted link connected between the movable member and the shoe plate.

In accordance with a second modification of the present invention, the movable member becomes an extensible element, one end of which is secured on the housing, and the other end of which is secured in relation to the shoe plate.

These and other objects of the present invention will become apparent from a reading of the following specification, taken in conjunction with the enclosed drawings, in which:

FIGURE 1 is a side elevation of a typical portable electric saw with which the teachings of the invention may find particular utility, the saw being adjusted to its maximum depth-of-cut position;

FIGURE 2 is a front elevation of the saw shown in FIGURE 1;

FIGURE 3 is a section taken along the lines 3—3 of FIGURE 2, looking into the other side of the upper and lower guards, and showing the air discharge opening for directing an air stream to the vicinity of the work surface where the cuting edge of the blade leaves the work;

FIGURE 4 is a view corresponding substantially to that of FIGURE 3, but showing the saw adjusted to a reduced depth-of-cut position, and further showing the manner in which the air discharge opening is automatically adjusted so that the air stream is redirected to the vicinity of the new position of the blade edge;

FIGURE 5 is a view corresponding substantially to that of FIGURE 4, but showing the saw adjusted to a further reduced depth-of-cut position, and further showing the manner in which the air discharge opening is automatically adjusted to again redirect the air stream;

FIGURE 6 is a section view taken along the lines 6—6 of FIGURE 2, looking into the air discharge aperture in the motor housing, and showing a portion of the fan or equivalent blower means for generating the air stream;

FIGURE 7 is a fragmentary longitudinal section of the saw unit, taken along the lines 7—7 of FIGURE 6;

FIGURE 8 is a schematic presentation of the prior art structures;

FIGURE 9 is a schematic presentation of the teachings of the present invention as applied to a straight up-and-down raising and lowering movement of the housing with respect to the shoe plate, it being noted that the air discharge opening has been adjusted so that the air stream is redirected to the particular cutting edge of the saw blade;

FIGURE 10 is a schematic presentation of the teachings of the present invention as applied to a saw which has a pivotable raising and lowering movement of the housing with respect to the shoe plate;

FIGURE 11 is a fragmentary perspective of the front portion of the saw unit showing the manner in which the air stream blows away the saw dust particles from the immediate line-of-cut on the top surface of the work piece;

FIGURE 12 is a first modification of the invention in which a movable member is connected to the shoe plate by means of a pivoted link; and FIGURE 13 is a second modification in which an extensible element is used for changing the direction of the air discharge opening relative to the shoe plate.

With reference to FIGURES 1 and 2, there is illustrated a portable electric saw 10 with which the teachings of the present invention may find particular utility; however, it will be appreciated by those skilled in the art that the essence of the invention is not necessarily confined to the particular construction of the saw 10, but rather is feasible with other types of saw structures and designs. With this in mind, the saw 10 comprises a shoe plate 11 by means of which the unit may be supported on the top surface of a work piece; a blade 12 extending through the shoe plate to engage the work, the blade being mounted upon the saw arbor 13; a housing 14 with a suitable electric motor to drive the blade in the conventional manner; depth adjustment means generally denoted as at 15 for selectively raising and lowering the housing structure with respect to the shoe plate to facilitates various depth-of-cut positions of the saw blade, the means including a sperically-formed bearing knuckle 15*a* to facilitate a pivoting of the housing structure at the rear of the shoe plate; means generally denoted as at 16 for tilting the housing structure with respect to the shoe plate to facilitate a bevel cut; an upper handle 17 for manually guiding and controlling the saw, the handle having a trigger switch 18 for energizing the saw from an electrical line cord 19; a front knob 20 to assist in the manual control of the unit; an upper guard 21 suitably mounted in the housing; a lower guard 22 adapted to telescope within the upper guard upon engagement with the work; and a lever 23 secured to the lower guard to facilitate its optional manual retraction.

With reference to FIGURE 7, the housing 14 encases an electric motor 24 which is provided with an armature shaft 25, and the shaft is journaled in a suitabled bearing in the housing and is connected with conventional gearing (not shown) for driving the saw arbor 13 in the usual manner. A fan 26 has a hub 27 mounted on the shaft and driven thereby. In lieu of the fan, any suitable blower or air discharge means may be used. The fan draws air in through the rear of the housing in a conventional manner and discharges the same into an aperture 28, see FIGURES 6 and 7, formed in the housing.

A substantially arcuately-shaped flange 29 is formed on the motor housing 14, and a correspondingly substantially arcuately-shaped flange 30 is mounted on the inner wall of the upper guard 21. The flanges 29 and 30 are adapted to telescope partially within one another as the housing structure is lowered with respect to the shoe plate, and the flanges 29 and 30, together with the inner wall of the upper guard, define an air conduit 31 therebetween. The air conduit 31, see FIGURES 3–5, communicates the aperture 28 with an air discharge opening 32 formed between the extremity of the flange 30 and the overall housing structure 14. In the maximum-depth-of-cut position of the saw, see FIGURE 3, an air stream will be discharged (as indicated by the large arrow) in the vicinity of the line-of-cut where the cutting edge of the blade 12 emerges from the work; and as shown in the partial perspective of FIGURE 11, will be effective to blow the saw dust particles away from the immediate (or succeeding) portion of the line-of-cut, such that the operator's vision will not be otherwise impaired.

Preferably, the upper guard 21 is pivotably mounted on the hub 33 secured to the housing 14, see FIGURE 7; and a substantially L-shaped link 34, see FIGURE 1, is provided, w ith one end of the link 34 being pivotably mounted to the shoe plate 11 and the other end being pivotably mounted to the upper guard 21. In such a manner, the upper guard 21 will pivot around the hub 33 as the housing is raised or lowered with respect to the shoe plate. The purpose of the link 34 and the pivotable mounting of the upper guard 21 is to insure that the front portion 21*a* of the upper guard, see FIGURE 1, will protect the exposed front portion of the saw blade 12 as the unit is adjusted to a reduced depth-of-cut position. The central structure and function of the pivoted link 34 forms no part of the present invention, but further details thereon may be obtained in the co-pending Elson application Serial No. 366,343, filed May 11, 1964, and assigned to the assignee of the present invention.

When the housing structure is raised for a reduced depth-of-cut position of the saw blade with respect to the shoe plate, as in FIGURES 4 and 5, the link 34 causes the upper guard 21 (and the flange 30 carried thereby) to pivot on the hub 33 of the motor housing 14, with the result that the air discharge opening 32 is automatically changed so that the air stream is redirected to the new position of the saw blade; and this insures that the air stream will always be directed to the proximity of the respective line-of-cut regardless of the particular depth-of-cut position of the blade.

The inherent utility and advantage of the present invention may be appreciated more readily by comparing it with the structures and devices of the prior art as shown in schematic form in FIGURES 8, 9, and 10. In FIGURE 8, which is indicative of the prior art devices, whenever the housing structure 14 (and hence the saw blade 12) is raised from a maximum to a reduced depth-of-cut position, two conditions occur: first, the intersection of the saw blade 12 and the shoe plate 11 is retracted rearwardly; and secondly, the air discharge opening 32 is invariably raised with respect to the shoe plate, although in a parallel position, with the result that the air stream is now directed to an advanced forward position of the shoe plate, a situation which becomes more and more pronounced with still shallower depth-of-cut positions of the saw blade. Consequently, whenever the prior art structures are adjusted from their maximum position to a reduced depth-of-cut position, the saw dust blower becomes increasingly ineffective; and as a result, the saw dust particles and chips become accumulated around the cutting edge of the blade, and more specifically, at the point where the edge of the blade leaves the work, thereby obscuring the operator's vision of the succeeding line-of-cut and interfering with his convenient usage and control of the tool.

The preferred form of the invention (as hereinbefore described with reference to FIGURES 1–7) is illustrated schematically in FIGURE 10. As the housing structure 14 is pivotally raised with respect to the shoe plate 11, the air discharge opening 32 is automatically shifted into a new position 32*a*, such that the air stream is re-directed to the new intersection of the cutting edge of the saw blade 12 and the shoe plate 11, thereby insuring that the saw dust particles and chips will be removed from the line-of-cut.

The invention as applied to a straight up-and-down movement of the housing structure 14 with respect to the shoe plate 11 is illustrated schematically in FIGURE 9. Here, whenever the housing 14 is raised vertically with respect to the shoe plate 11, the air discharge opening 32 is shifted into a new position 32*b*, such that the air stream is re-directed to preclude saw dust from accumulating on the line-of-cut in the manner hereinbefore described.

A first modification is illustrated in FIGURE 12. Here, a movable member 35, which has the same basic design and function as the arcuate flange 30 carried by the upper guard 21 in the preferred embodiment of FIGURES 1–7, is connected (not to the upper guard) but rather, to the shoe plate 11 by means of a pivoted link 36, and the movable member 35 is guided for partial telescopic movement between the flange 29 on the housing structure and a retaining member 29*a* on the structure. Whenever the housing structure 14 is raised with respect to the shoe plate 11, the pivoted link 36 causes the movable member 35 to shift the position of the air discharge opening 32; and in the manner as previously described with reference to the preferred embodiment, precludes saw dust from accumulating on the line-of-cut.

A second modification is illustrated in FIGURE 13. Here, an extensible element 37 has one end secured to the flange 29 and the other end secured to a member 38 carried by the shoe plate 11. The purpose of the extensible element 37 and member 38 is the same as before, namely, to automatically change the direction of the air discharge opening 32 and hence to re-direct the air stream to the new intersection of the cutting edge of the saw blade and the shoe plate.

It will be appreciated by those skilled in the art that the teachings of the present invention are equally applicable to other types of saw blades than that which is illustrated in FIGURE 1 of the drawings. For example, instead of a woodcutting blade as shown in FIGURE 1, a metal-cutting friction-operated blade may be used as well as an abrasive wheel.

Obviously, many modifications may be made without departing from the basic spirit of the present invention; and accordingly, within the scope of the appended claims, the invention may be practiced other than has been specifically described herein.

I claim:

1. In a portable power-driven saw of the type having a shoe plate by means of which the unit may be supported on the top surface of a workpiece, a blade extending through the shoe plate to engage the work, a housing with a motor to drive the blade, means to raise and lower the housing with respect to the shoe plate for selective depths-of-cut of the blade, a blade guard pivotable mounted on the housing, and means to pivot the guard on the housing in accordance with the selective raising and lowering movements of the housing with respect to the shoe plate, the improvement which comprises:

(a) air discharge means including an aperture formed in the housing:
(b) a first arcuate flange mounted on the housing around said aperture;
(c) a second arcuate flange carried by the guard;
(d) said flanges telescoping with respect to one another, thereby forming an air conduit which is in communication with said aperture formed in the housing;
(e) said second flange and the housing having an air discharge opening therebetween, whereby a stream of air is directed to the approximate point where the cutting edge of the blade leaves the work for blowing the saw dust away from the vicinity of the succeeding portion of the line-of-cut on the work surface; and
(f) whereby as the housing is raised or lowered with respect to the shoe plate, the guard pivots on the housing, thereby automatically changing the position of said air discharge opening with respect to the shoe plate, and thereby providing for the air stream to be directed at all times to the proximity of the said line-of-cut regardless of the particular depth-of-cut position of the blade.

2. In a portable power-driven saw of the type having a shoe plate by means of which the unit may be supported on the top surface of a workpiece, a blade extending through the shoe plate to engage the work, a housing with a motor to drive the blade, and means to raise and lower the housing with respect to the shoe plate for selective depths-of-cut of the blade, the improvement which comprises:

(a) a blade guard mounted on the housing for pivotal movement with respect to the housing in accordance with the selective raising and lowering movements of the housing with respect to the shoe plate;
(b) a movable member cooperating with the housing to form an air discharge opening therebetween;
(c) said movable member comprising an arcuately-formed flange carried by the pivotally-mounted guard and telescopically received within the housing;
(d) air blower means in the housing;
(e) means communicating said air blower means with said air discharge opening;
(f) whereby a stream of air is directed to the line-of-cut to blow away the saw dust particles, and
(g) means to automatically change the position of said flange with respect to the shoe plate in accordance with the selective raising and lowering movements of the housing with respect to the shoe plate, thereby automatically changing the position of said air discharge opening;
(h) whereby the air stream is always directed to the proximity of the line-of-cut regardless of the particular depth-of-cut position of the blade.

3. In a portable power-driven saw of the type having a shoe plate by means of which the unit may be supported on the top surface of a workpiece, a blade extending through the shoe plate to engage the work, a housing with a motor to drive the blade, and means to raise and lower the housing with respect to the shoe plate for selective depths-of-cut of the blade, the improvement which comprises:

(a) a movable member cooperating with the housing to form an air discharge opening therebetween;
(b) air blower means in the housing;
(c) means communicating said air blower means with said air discharge opening;
(d) whereby a stream of air is directed to the line-of-cut to blow away the saw dust particles; and
(e) means to automatically change the position of said movable member with respect to the shoe plate in accordance with the selective raising and lowering movements of the housing with respect to the shoe plate, thereby automatically changing the position of said air discharge opening;
(f) said last-named means comprising a pivoted link between said movable member and the shoe plate;
(g) whereby the air stream is always directed to the proximity of the line-of-cut regardless of the particular depth-of-cut position of the blade.

4. In a portable power-driven saw of the type having a shoe plate by means of which the unit may be supported on the top surface of a workpiece, a blade extending through the shoe plate to engage the work, a housing with a motor to drive the blade, and means to raise and lower the housing with respect to the shoe plate for selective depths-of-cut of the blade, the improvement which comprises:

(a) a movable member cooperating with the housing to form an air discharge opening therebetween;
(b) said movable member comprising an extensible element, one end of which is secured to the housing, and the other end of which is secured to the shoe plate;

(c) air blower means in the housing;

(d) means communicating said air blower means with said air discharge opening;

(e) whereby a stream of air is directed to the line-of-cut to blow away the saw dust particles; and (f) means to automatically change the position of said said movable member with respect to the shoe plate in accordance with the selective raising and lowering movement of the housing with respect to the shoe plate, thereby automatically changing the position of said air discharge opening;

(g) whereby the air stream is always directed to the proximity of the line-of-cut regardless of the particular depth-of-cut position of the blade.

5. In a portable power-driven saw of the type having a shoe plate by means of which the unit may be supported on the top surface of a workpiece, a blade extending through the shoe plate to engage the work, a housing with a motor to drive the blade, and means to raise and lower the housing with respect to the shoe plate for selective depths-of-cut of the blade, said means including a pivot at the rear of the shoe plate, the improvement which comprises, in combination:

(a) an upper guard for the blade, the guard being pivotably mounted on the housing;

(b) means to pivot the guard in accordance with the selective raising and lowering movements of the housing with respect to the shoe plate;

(c) means including an air discharge opening formed between the housing and the pivotably-mounted upper guard, directing a stream of air to the approximate point where the cutting edge of the blade leaves the work, thereby blowing the saw dust away from the vicinity of the succeeding portion of the line-of-cut on the work surface; and (d) means to automatically change the position of the air discharge opening, circumferentially about the pivot axis of the upper guard, in accordance with the selective raising and lowering movements of the housing, whereby the air stream is always directed substantially to the proximity of the intersection of the cutting edge of the saw blade and the shoe plate, thereby insuring that the saw dust particles and chips will be removed from the line of cut regardless of the particular depth-of-cut position of the blade.

6. In a portable power-driven saw of the type having a shoe plate by means of which the unit may be supported on the top surface of a workpiece, a blade extending through the shoe plate to engage the work, a housing with a motor to drive the blade, and means to raise and lower the housing with respect to the shoe plate for selective depths-of-cut of the blade, the improvement which comprises:

(a) a separate member, independent of the housing and of the shoe plate, and cooperating with the housing to form an air discharge opening therebetween;

(b) air blower means in the housing;

(c) means communicating said air blower means with said air discharge opening;

(d) whereby a stream of air is directed to the line-of-cut to blow away the saw dust particles; and (e) means to automatically adjust the position of said member relative to the housing, as the housing moves relative to the shoe plate in accordance with the selective depth-of-cut position of the blade, thereby automatically changing the position of said air discharge opening;

(f) whereby the air stream is always directed substantially to the proximity of the intersection of the cutting edge of the saw blade and the shoe plate, thereby insuring that the saw dust particles and chips will be removed from the line of cut regardless of the particular depth-of-cut position of the blade.

References Cited by the Examiner

UNITED STATES PATENTS

| | | | |
|---|---|---|---|
| 1,830,579 | 11/1951 | Wappat | 143—157 |
| 2,767,747 | 10/1956 | Burrows | 143—43 |

WILLIAM W. DYER, Jr., *Primary Examiner.*

W. D. BRAY, *Assistant Examiner.*